Dec. 12, 1944.　　　　E. J. ARENA　　　　2,364,770
HAND SEXTANT
Filed Sept. 7, 1942　　　2 Sheets-Sheet 2

ERNEST J. ARENA,
INVENTOR.

BY Angelo M. Pisarra
ATTY.

Dec. 12, 1944.　　　　E. J. ARENA　　　　2,364,770
HAND SEXTANT
Filed Sept 7, 1942　　　2 Sheets-Sheet 1

Ernest J. Arena
INVENTOR.

BY Angelo M. Pisarra
ATTY.

Patented Dec. 12, 1944

2,364,770

UNITED STATES PATENT OFFICE 2,364,770

HAND SEXTANT

Ernest J. Arena, Hempsted, N. Y.

Application September 7, 1942, Serial No. 457,555

2 Claims. (Cl. 88—2.4)

This invention relates to sextants and more particularly to those of the bubble type. In one of its aspects, the invention is directed to a novel sextant which is particularly adapted for use in aircraft, although it may be used for the same purpose in other places, such as marine vessels and the like.

One of the objects of this invention is to provide a hand sextant which is mechanically simple in construction, may be manufactured at a relatively low cost, is rugged, and may be readily repaired when desired.

Another object of this invention is to provide a sextant which is simple to operate and accurate.

Another object of this invention is to provide a sextant so shaped and balanced, that it fits the normal hand without the necessity of handles or hand grips, so that it may be easily and quickly manipulated by hand for the purpose of taking observation either in the daytime or at night.

Other objects of the invention will in part be obvious and will in part appear hereinafter.

The invention comprises the features of construction, combination of elements, and arrangement of parts, which will be exemplified in the construction hereinafter set forth, and the scope of the invention will be indicated in the claims.

A specific embodiment of the invention is illustrated in the accompanying drawings, wherein.

Figure 3:
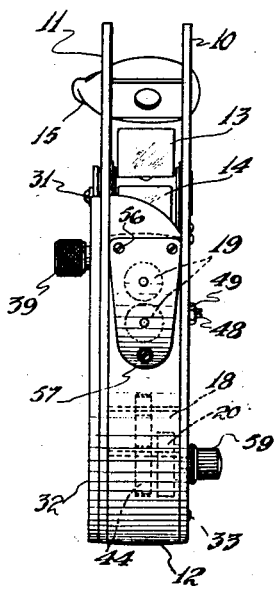
Figure 3 is a front view of the sextant shown in Figure 1.
Figure 4:
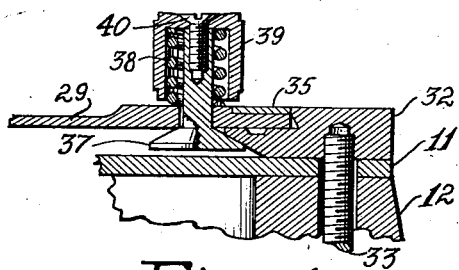
Figure 4 is an enlarged detail sectional view through the index mirror arm and scale, showing means for locking, releasing and actuating the index mirror arm and parts mounted thereon, relative to the scale.
Figure 5:
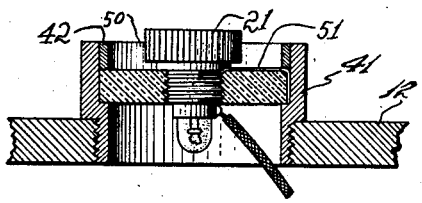
Figure 5 is an enlarged sectional view through the combination daylight and night illuminating chamber for the bubble, and illustrates the manner of mounting the daylight illuminating window and the night bubble illuminating lamp mounted thereon.
Figure 6:
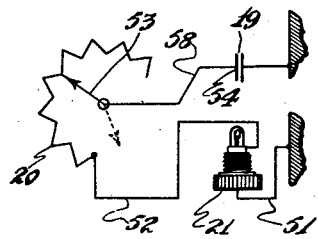
Figure 6 is a wiring diagram of the lamp circuit.
Figure 7:
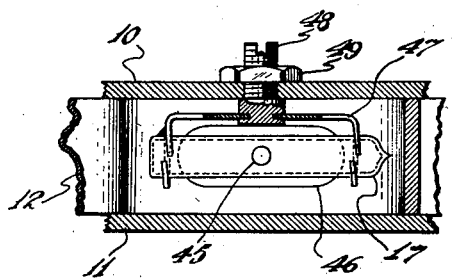
Figure 7 is an enlarged plan and sectional view of the bubble chamber and illustrates the manner of mounting the bubble tube.
Figure 8:
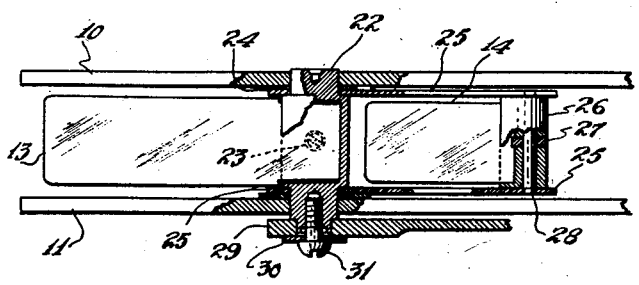
Figure 8 is an enlarged plan and sectional view illustrating the mounting of the sun shades, index mirror and index mirror arm.

According to the invention there are provided a pair of side plates 10 and 11. These side plates 10 and 11 are of substantially the same edgewise contour and shape. The plates 10 and 11 are of such size and shape that the normally lower parts thereof will fit in the palm of the average or normal hand. Integral with plate 10 and extending therefrom, are a number of upstanding ribs 12 providing chambers for certain elements combined therewith, and also serving as spacers between the parallel plates 10 and 11 when assembled, as well as providing finger grips. The upper portions of the plates 10 and 11 are somewhat narrower than the lower portions thereof, and project therefrom.

Mounted in the relatively narrow space between the parallel side plates 10 and 11 are an index mirror 13, sun shades 14, eye shield 15, collimating lens 16, leveling bubble 17, bubble mirror 18, batteries 19, combined rheostat and switch 20, and bubble illuminating lamp 21.

The assembly of this device is relatively simple and moreover, the arrangement of the parts is such that any repair can be carried out in a simple and expeditious manner, requiring only the replacement of any interiorly located part by a new part.

The index mirror 13 may be a transparent glass reflector and may be mounted on a pivotal shaft 22 as shown. The shaft 22 has a slot therein in which is located one end of the mirror which is demountably secured thereto by set screw 23.

The ends of the shaft 23 are located in opposite disposed openings in the plates 10 and 11 with the mirror 13 located between said plates. The outer ends of the shaft 22 are of reduced diameter and between that portion of the shaft 22 carrying the mirror 23 of the inner sides of the side plates 10 and 12 are located thrust bearings 24 and side arms 25 carrying pivotally mounted sun shades 14.

By this construction, a thrust force is developed on the thrust bearings 24, sun shade arms 25 and on the shoulders of shaft 22 because of their spaced relationship with the side plates 10 and 11 causing a slide springing action by side plates 10 and 11 on the above mentioned parts for the purpose of inducing friction between the face of the sunshade arms 25 and the adjacent parts.

This friction is utilized to maintain the sun shade supporting arms 25 and the sun shades 14 in any desired fixed relation with the index mirror 13 for the purpose known to the art while taking an observed altitude of the sun or the moon.

It also serves to more firmly hold and positively maintain the index mirror in any desired position. The sun shades 14 may be of rectangular configuration and may be of colored optical glass of different filtering characteristics.

For the purpose of obtaining a greater filtering range than normally could be obtained with a single sun shade, the sun shades 14 are pivotally mounted independently of each other in frames 26 separated by friction washer 27 and these frames 26, together with friction washer 27 are mounted in combination on a pivot 28 supported between the arms 25.

This spaced relationship is such that sufficient friction is maintained on frames 26 and washer 27, so that these sun shades 14 may be moved independently of each other, or in unison, and in combination with the arms 25, and will remain in any desired selected position. The shaft 22 has a shoulder projecting beyond one of the side plates 11.

Index mirror position indicated on 29 is demountably secured to shaft 22 by a friction washer 30 and screw 31. By the use of this type of mounting an adjustment can easily be made between the position of the index mirror 13 and the position of the shaft 22.

Positive indicating arm 29 at the same time provides a positive lock while in use. Mounted on the outer face of the plate 11 is an altitude indicating scale 32 which records the position of the index mirror for purposes known to the art.

The indicating scale 32 is in radial relationship to the index mirror pivot shaft 22 and is demountably secured to the side plate 11 by screws 33 which pass through plate 11 and make threaded engagement with openings in the ribs 12 thus acting as a demountable connecting device for the plates 10 and 11.

Since the index mirror 13 has a normal requisite travel about its pivot fulcrum of 45° in combination with the incorporated optical distribution of parts, embodied in my invention, in order to cover a range of location of celestial bodies being observed and altitudes ranging from 0° horizontal to 90° vertical, the recording scale 32 is graduated from 0° to 101°.

The last 11° of this arc are necessary only to interpolate on the vernier scale. The degrees between 80° and 90° on the recording scale 32 has graduations 34 so graduated that ½° of actual arc represents one indicated degree of travel, of the index mirror 13. Correspondingly, the vernier plate at the end of the arm 29 has graduations 36 graduated to interpolate the graduations on scale 32 in accordance with the art.

In order to facilitate movement of arm 29 and at the same time provide sufficient friction between arm 29 and recording scale 32, to maintain both in a semi-fixed relation to each other, so that under normal usage the index mirror 13 and arm 29 will remain in any position throughout the normal range of travel of same, unless it is desired to move same for purposes of making altitude observations of celestial bodies, I have provided a friction wheel 37 which is mounted in a bearing through arm 29 and held against the beveled surface of scale 32 by a spring 38. Attached to friction wheel shaft 37 which is an integral part of the friction wheel, is a thumb knob 39, fastened securely by means of a screw 40. This thumb knob 39 and friction wheel 37 coupled with three other elements permits micrometer type movement of the index mirror arm 29 with respect to an indicating scale 32, thus permitting a precise and accurate reading of the graduations 34 and 36 on the recording scale 29, and vernier 35 respectively.

It will also be realized from the accompanying drawings that a relatively rapid movement of arm 29 may be accomplished by depressing knob 39 with the thumb in the direction of side plate 11 thereby disengaging friction wheel 37 with beveled edge of scale 32 while at the same time pushing or pulling knob 39 in the direction and magnitude desired.

It is, of course, realized that a rapid movement of arm 29 and index mirror 13 enhances the speed required to make observations between celestial bodies which have a wide spread between their altitudes, such as a celestial body at or near zenith and one which is low on the horizon or vice versa.

Arranged along one of the optical axes in order to direct the observer's eye along this axis for the purpose of facilitating indirect sights, I have provided an eye shield 15. Further along this axis I have provided a collimating lens 16, contained within a lens holder 41 and held within holder 41 by a snap ring 42, this lens holder 41 being held in position and adjustment by threads on its lower diameter, engaging with threads provided for same in casting 12.

The purpose of this collimating lens is known to the art. Below the collimating lens 16 and included within the interior of the instrument, I have provided a front silvered mirror 18, placed in fixed relation to the optical axis, and insulated from contact with casting 12 by a gasket 43 and maintained in position by a flat spring 44. The purpose of insulating front silvered surface of mirror 18 from casting 12 by gasket 43 is to prevent this silvered surface from being scratched or marred during or after installation of same. The purpose of this mirror 18 is to direct the image of the bubble 45 along the optical axis.

Arranged along the vertical optical axis of my invention, I have provided a bubble tube 17, having a radius of curvature for the bubble 45 equal to the focal length of the optical system which permits a more liberal alignment of the bubble with the balance of the optical system. In order to prevent extraneous light and other unnecessary details, other than the image of the bubble 45 and approximating 10 degrees each side of the optical vertical axis of the bubble tube 17, to be viewed in the bubble mirror 18 and thus distract the eye of the observer, I have provided a hole 46 in casting 12, large enough to accomplish the aforementioned. The bubble tube is held in its respective position by a support 47 which is maintained in correct adjustment along the center line of the instrument and at a proper angle with respect to the vertical optical axis by screw stud 48 and locked in position by a nut 49.

Arranged approximately along the vertical optical axis and above but leading into the bubble chamber, of my invention, I have provided a combination daylight and night bubble chamber, illuminating device consisting of another lens holder 41. Included within lens holder 41 is a transparent dielectric window 50 to transmit daylight into the bubble chamber, and an illuminating lamp 21. Lens holder 41 is made from a material which is an electrical conductor thereby enabling an electrical ground to be established between one pole of the lamp 21 and casting 12 which is the grounded side of the electrical circuit, by the medium of a fine wire 51. Lamp 21 screws into a threaded hole in window 50 and both are retained in the lens holder by another snap ring 42.

Electric power is supplied to lamp 21 by two batteries 19. Control of the lamp with respect to intensity of illumination and also the off position of the current is accomplished by a combination switch and rheostat 20, its resistance element being connected to non-grounded side of lamp 21, by an insulated wire 52. The moving arm 53 of the rheostat switch is connected to battery contacts 54, retained and insulated from other metal contact by a dielectric cap 55 which is retained to casting 12 by screws 56 and 57 for facilitating removal and installation of fresh batteries when desired, by an insulated wire 58. The opposite end of the batteries are grounded to the casting 12. Manual control of rheostat 20 is accomplished by a knob 59 which is attached to the moving contact arm 53 of rheostat 20, extending to exterior of the instrument thru side plate 10 and insulated from same.

Sun shades 14 are held at rest when not in use by a spring clip 60 which is retained to casting 12 by a screw 61.

Figure 1:
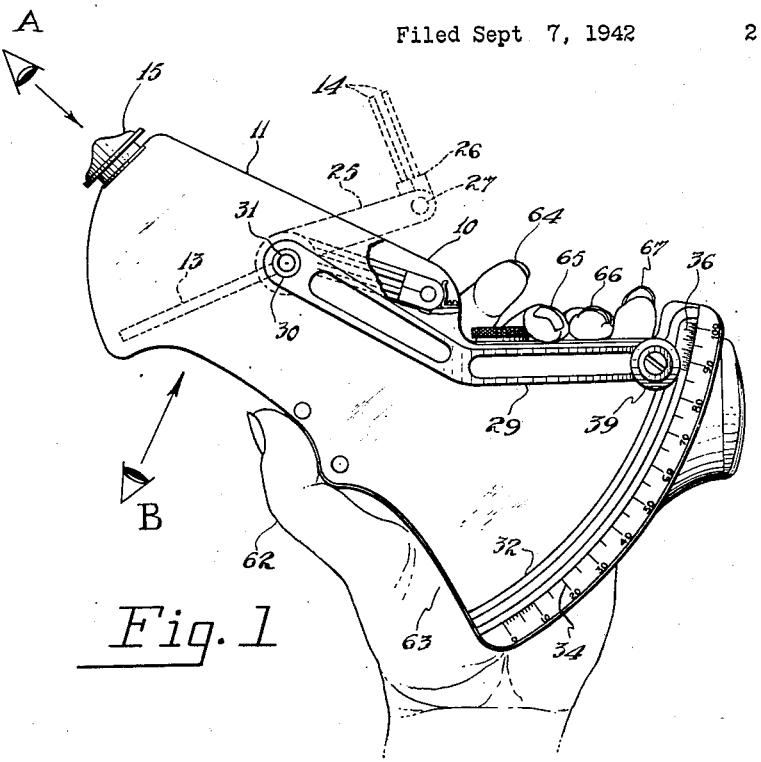
Figure 1 is a view in side elevation and partly in cross section and illustrates the position of the hand relative thereto in using the same.

Operation of the instrument is as follows: The instrument as shown in the accompanying drawings is designed to be held in the operator's left hand as shown in Figure 1, and operated by the right hand of the operator. While this method is generally desirable, I do not limit this invention solely to this arrangement, since it will be realized that by a transposition of certain parts, the instrument may be operated by the left hand while being held in the right hand of the operator.

It will be noted that the shape of my invention is such that it fits the contour of the normal operator's thumb 62 and the lower left portion of the palm 63, while gripped along the top of casting 12, with the remainder of the fingers designated 64, 65, 66 and 67. It will also be noted that the index finger 64 can be left free if desired for the purpose of shading the light rays during daylight which are allowed to enter the bubble chamber thru daylight window 50, thereby making it possible to eliminate any or all extraneous light rays viewed in bubble mirror 18.

Figure 2:
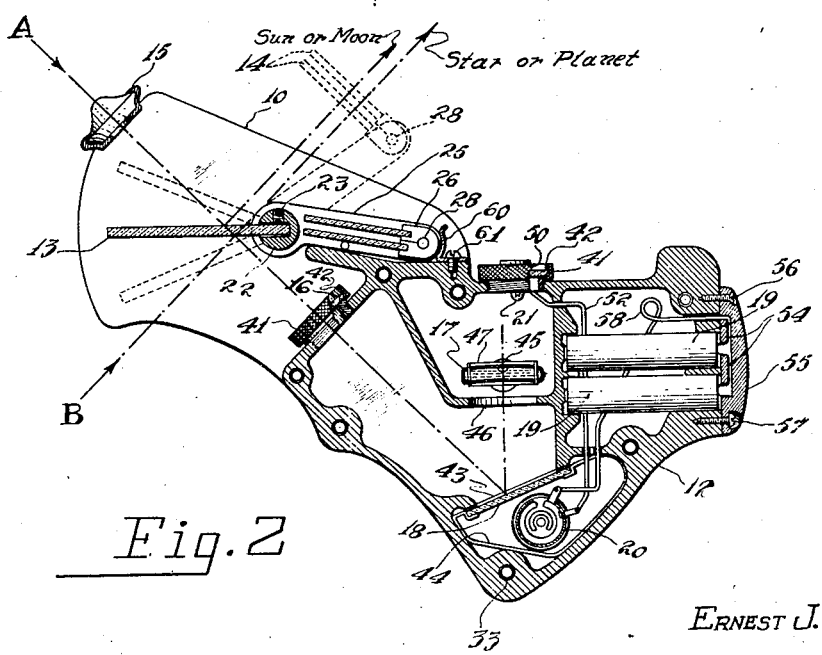
Figure 2 is a longitudinal section of the sextant shown in Figure 1 but with a side plate removed.

In operating the instrument, for an indirect sight, the observer's eye is placed at A. Referring to Figures 1 and 2, so that he looks downwardly along one of the optical axes at an angle at the index mirror 13, and sees the image of the sun or moon reflected therein, filtered by the sun shades 14, if desired. Simultaneously, he sees the image of the bubble 45, which is projected to the index mirror 13, by collimating lens 16 and bubble mirror 18, in combination.

The image of the sun or moon and that of the bubble are brought into coincidence by an adjustment of the index mirror 13 and actuated by knurled thumb knob 39, the angular disposition or altitude of the celestial body being recorded in combination by the position of the vernier plate 35, and its graduations 36, with respect to graduations 34 on recording scale 32.

In operating the instrument for a direct sight, the observer's eye is placed approximately at position B, as shown in Figures 1 and 2 looking upward and through the index mirror 13, directly at the celestial body, such as a star or planet. The index mirror 13 is then adjusted so that the reflected image of the bubble, illuminated sufficiently by lamp 21, is made to coincide with the celestial body as viewed through the index mirror 13. The angular disposition or altitude of the celestial body being recorded at scale 32, and vernier 35, in the same manner described for an indirect sight. Both of these methods being well known to the art.

It will be understood that the above description and the accompanying drawings comprehend only the general and preferred embodiment of my invention, and that various changes in minor details of construction, proportion and arrangement, of parts may be resorted to within the scope of the appended claims and without sacrificing any of the advantages of my invention.

I claim:

1. A hand sextant comprising a pair of side plates, rib spacing means secured to one of said plates and extending from the inner face thereof, an index mirror located between said side plates at the normally upper portion thereof, a collimating lens located between said side plates and supported by said rib spacing means, a bubble mirror disposed between said side plates at the normally lower portion thereof, and demountably mounted on said rib spacing means, a leveling bubble mounted between said side plates, a transparent window supported by said rib spacing means, a lamp supported by said window and located between said side plates, said bubble mirror, leveling bubble and lamp being in line, a rheostat located between said side plates and disposed adjacent and below said bubble mirror, an electric battery located between said side plates and supported by said rib spacing means and means electrically connecting in series said battery, rheostat and lamp.

2. A hand sextant comprising a pair of side plates, rib spacing means secured to one of said plates and extending from the inner face thereof, an index mirror located between said side plates at the normally upper portion thereof, a collimating lens located between said side plates and supported by said rib spacing means, a bubble mirror disposed between said side plates at the normally lower portion thereof, and demountably mounted on said rib spacing means, a leveling bubble mounted between said side plates, a transparent window supported by said rib spacing means, a lamp supported by said window and located between said side plates, said bubble mirror, leveling bubble and lamp being in line, a rheostat located between said side plates and disposed adjacent and below said bubble mirror, an electric battery located between said side plates and supported by said rib spacing means and means electrically connecting in series said battery, rheostat and lamp, said rheostat, bubble mirror and collimating lens being in line.

ERNEST J. ARENA.